US005968854A

United States Patent [19]

Akopian et al.

[11] Patent Number: 5,968,854

[45] Date of Patent: Oct. 19, 1999

[54] EMI SHIELDING FABRIC AND FABRIC ARTICLES MADE THEREFROM

[75] Inventors: Vladimir Akopian; Alexander Chirkov, both of Lincoln, R.I.

[73] Assignee: Electromagnetic Protection, Inc., Lincoln, R.I.

[21] Appl. No.: 08/943,957

[22] Filed: Oct. 3, 1997

[51] Int. Cl.[6] .................................. B32B 9/00; G21F 3/02

[52] U.S. Cl. .......................... 442/132; 443/133; 428/357; 428/361; 428/373; 428/375; 428/381

[58] Field of Search ..................................... 428/357, 361, 428/373, 375, 381; 442/132, 133

[56] References Cited

U.S. PATENT DOCUMENTS

| | | |
|---|---|---|
| 2,357,851 | 9/1944 | Scheyer . |
| 2,623,549 | 12/1952 | Archer . |
| 3,039,172 | 6/1962 | Egan . |
| 3,047,860 | 7/1962 | Swallow et al. . |
| 3,164,840 | 1/1965 | Reynolds . |
| 3,489,591 | 1/1970 | Cardarelli . |
| 3,969,731 | 7/1976 | Jenkins et al. . |
| 4,030,892 | 6/1977 | Mendelsohn et al. . |
| 4,064,305 | 12/1977 | Wallin . |
| 4,092,453 | 5/1978 | Jonda . |
| 4,126,287 | 11/1978 | Mendelsohn et al. . |
| 4,549,187 | 10/1985 | Levy . |
| 4,572,960 | 2/1986 | Ebneth et al. . |
| 4,923,741 | 5/1990 | Kosmo et al. . |
| 5,073,984 | 12/1991 | Tone et al. . |
| 5,081,455 | 1/1992 | Inui et al. . |
| 5,275,861 | 1/1994 | Vaughn . |
| 5,570,476 | 11/1996 | Olive . |
| 5,578,359 | 11/1996 | Forbers et al. . |

FOREIGN PATENT DOCUMENTS

| | | |
|---|---|---|
| PCT/US92/00244 | 1/1992 | WIPO . |

*Primary Examiner*—Richard Weisberger
*Attorney, Agent, or Firm*—Barlow, Josephs & Holmes, Ltd.

[57] ABSTRACT

An electromagnetic shielding fabric is formed entirely from a plurality of synthetic fiber yarns which have been previously coated with silver. The preferred yarn structure comprises silver-coated nylon yarns, although other synthetic yarns can also be used as a base for the silver-coated yarns. The silver content of the silver-coated synthetic yarn is preferably not less than 20% by weight, and the conductivity of the silver-coated yarn is preferably not less than 1.2 ohms/cm. The silver-coated synthetic yarns are preferably formed into a planar textile material by means of a warp-knitting method which interlocks all of the yarns in a continuous chain stitch. The resulting fabric is thus formed entirely of the conductive silver-coated yarns thereby providing superior conductivity and electromagnetic shielding capability.

18 Claims, 3 Drawing Sheets

EMI SHIELDING FABRIC AND FABRIC ARTICLES MADE THEREFROM

BACKGROUND AND SUMMARY OF THE INVENTION

The instant invention relates to electromagnetic shielding fabrics, and more particularly to an electromagnetic shielding fabric formed entirely of previously silver-coated synthetic yarns.

It is well known that exposure to long term or acute electromagnetic radiation can have undesirable effects on human tissue, and furthermore, it is also known that electromagnetic radiation can interfere with certain bio-electronic devices, such as pacemakers, which are essential to the daily lives of affected people. The recent proliferation of electronic devices, such as cell phones, and computer equipment, that emit low levels of electromagnetic radiation, or interference, has significantly increased the problem and created a need for everyday shielding garments. In this regard, a variety of electromagnetic shielding fabrics, and garments formed therefrom, have heretofore been known in the art. The previously known EMI shielding fabric constructions can be divided into three basic categories: (1) textile fabrics which are coated with a metallic coating after weaving or knitting of the fabric (see PCT Publication No. WO 92/13352, U.S. Pat. No. 4,572,960 and U.S. Pat. No. 5,275,861); (2) textile fabrics which are primarily formed with natural fibers and include selectively placed conductive yarns (see PCT Publication No. WO95/30229, U.S. Pat. No. 5,569,877, and U.S. Pat. No. 3,164,840; and (3) textile fabrics formed from yarns containing metallic fibers or strands (See U.S. Pat. No. 5,103,504).

While each of the above-noted constructions provides effective shielding characteristics, there are distinct disadvantages to each construction. In general, metal-coated fabrics are not flexible enough to form everyday wear garments. Still further metal-coated fabrics are subject to surface wear, and a subsequent decrease in conductivity and shielding as breaks are formed in the metal coating when the fabric is bent. With specific regard to WO 92/13352, the entire textile fabric is after-coated with copper. Copper, in general, is not a practical coating material for garments because copper oxidizes into copper oxide which is non-conductive, and furthermore, the copper oxide is known to leave a green residue on the wearer. With regard to textile fabrics having selectively placed conductive yarns, these fabrics generally do not provide a sufficient level of conductivity to provide high-level shielding capabilities. Finally, with regard to fabrics having yarns containing metallic fibers, the metallic fibers are usually located within the interior of the yarn to prevent contact with the wearer. However, because the conductive elements of the yarns are internalized, conductivity is not continuous from yarn to yarn, and therefore the fabrics formed from these yarns also do not provide a sufficient level of conductivity to provide high level shielding capabilities.

The instant invention provides a electromagnetic shielding fabric which is effective for shielding a person from electromagnetic radiation having a power density of up to 10 mw/cm$^2$, and which is also highly flexible and non-irritating to the skin of the wearer. More specifically, an electromagnetic shielding fabric is formed entirely from a plurality of synthetic fiber yarns which have been previously coated with silver. The preferred yarn structure comprises silver-coated nylon yarns. However, other synthetic yarns, such as acrylic yarns and polyester yarns can also be effectively used as a base for the silver-coating process. The silver content of the silver-coated synthetic yarn is preferably not less than 20% by weight, and the conductivity of the silver-coated yarn is preferably not less than 1.2 ohms/cm. The silver-coated synthetic yarns are preferably formed into a textile material by means of a warp-knitting method which interlocks all of the yarns in a continuous chain stitch. The resulting fabric is thus formed substantially entirely of the conductive silver-coated yarns thereby providing superior conductivity and electromagnetic shielding capability. Because of the resulting flexibility and suppleness of the silver-coated nylon fabric, the fabric can be fashioned into a variety of everyday wear garments, including shirts, pants, hoods, hats, bed sheets, blankets and curtains.

Accordingly, among the objects of the instant invention are: the provision of an EMI shielding fabric with a high-level of shielding capability that is also highly flexible, non-irritating to the skin and also bactericidal; the provision of a shielding fabric fashioned entirely from silver-coated nylon yarns wherein the silver content of the yarns is not less than 20% by weight; the provision of a shielding fabric fashioned entirely from silver-coated nylon yarns wherein the conductivity of the yarns is not less than 1.2 ohms/cm; the provision of EMI shielding garments fashioned entirely from silver-coated nylon yarns wherein the resulting fabric can be fashioned into a variety of everyday wear garments, including shirts, pants, hoods, hats, bed sheets, blankets and curtains.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
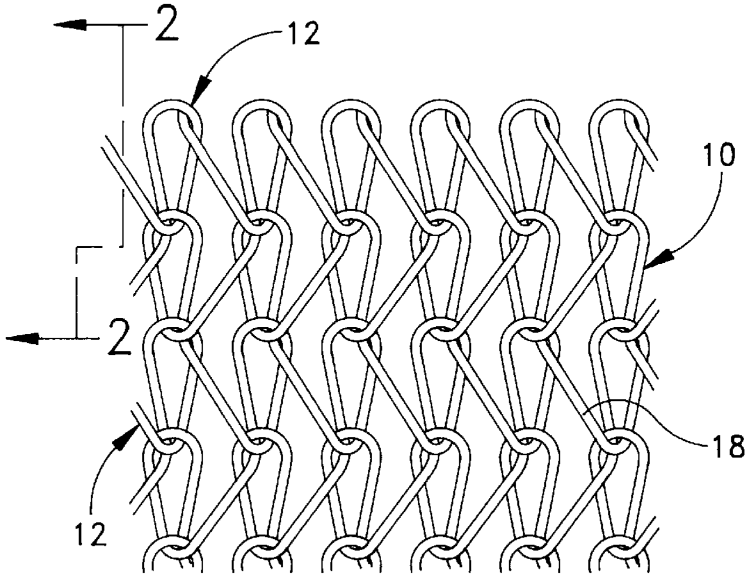
FIG. 1 is an enlarged plan view of a section of a warp-knit EMI shielding fabric constructed in accordance with the teachings of the present invention.

Referring now to the drawings, the EMI shielding fabric of the instant invention is illustrated and generally indicated at 10 in FIG. 1. As will hereinafter be more fully described, the instant fabric 10 provides a high level of shielding capability, and is able to be fashioned into a plurality of different garments and fabric articles for everyday use.

The EMI shielding fabric 10 is formed from a plurality of metal-coated synthetic fiber yarns generally indicated at 12 wherein the coated yarns 12 are woven, knitted, etc. together to form a planar fabric material. While only the most common textile fabrication methods are specifically recited herein, it is to be understood that virtually any type of textile fabrication technique could be utilized to form a fabric material from the metal-coated yarns 12. The shielding fabric 10 as specifically illustrated in FIG. 1 is knit on a double needle bar warp-knit knitting machine wherein the plurality of yarns 12 are knit together in a series continuous chain stitches to form a flat fabric. It is to be understood that the flat fabric 10 can be produced with somewhat of a three dimensional knitting structure which provides the fabric with some thickness. It is believed that the three-dimensional thickness of the warp-knit fabric provides a somewhat better shielding capability than other types of knit yarns structures. The art of warp knitting is well known to those skilled in the textile arts, and therefore the specific detailed knitting methods utilized to form the present flat fabric will not be described in detail herein.

Figure 2:
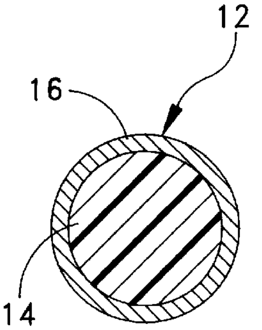
FIG. 2 is a cross-sectional view of one of the metal-coated yarns that make up the shielding fabric.

Referring to FIG. 2, the metal coated yarns 12 preferably comprise synthetic fiber yarns 14, such as nylon, acrylic or polyester yarns which are coated with an external layer of silver 16. In this regard, the coated yarns 12 preferably have a silver content which is not less than 20% by weight of the coated yarn, and furthermore the coated yarns 12 preferably have a conductivity of not less than 1.2 ohms/cm. Synthetic fiber yarns 14 are preferred for several reasons, including the flexibility of the resulting fabric, and furthermore because the synthetic yarns 14 are capable of receiving an external coating of metal (See FIG. 2) using conventional plating or coating techniques. In this regard, the yarns 14 are preferably coated with a silver coating 16 by means of a conventional electroplating bath. Silver is the preferred coating metal for several reasons including the facts that silver is not irritating to the skin, non-toxic, and non-carcinogenic. Silver is also preferred because silver oxide is conductive and because silver has bactericidal properties. The process of plating synthetic fiber yarns with silver is well known in the art, and therefore the specific methods utilized, including plating times, bath concentrations, and amperages will not be discussed herein.

Figure 8:
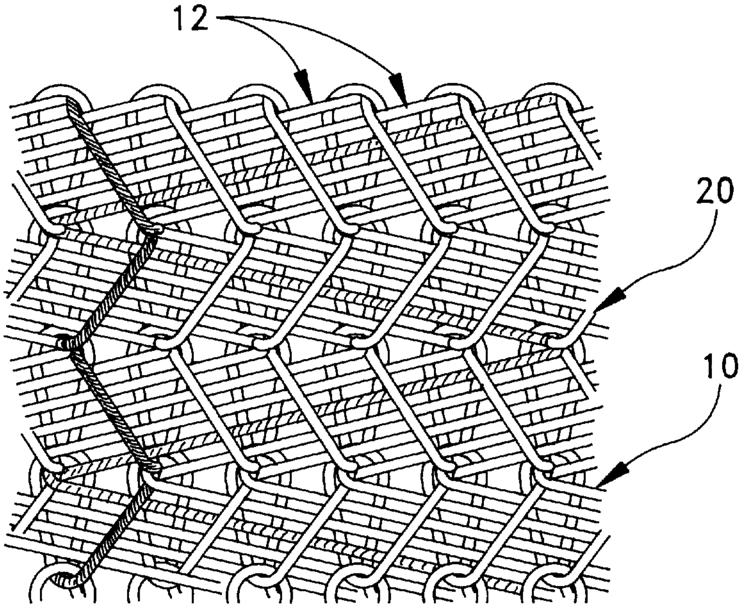
FIG. 8 is an enlarged plan view of a section of another type of knitted EMI shielding fabric constructed in accordance with the teachings of the present invention.

The previously coated yarns 12 as described above are knit into a planar or flat fabric 10 according to one of the above-noted methods. A warp-knit fabric structure 18 is illustrated in FIG. 1, while an alternative type of knit fabric structure 20 is illustrated in FIG. 8. As stated above, other textile fabrication methods are also contemplated for the formation of specialty garments or fabric articles, and in this regard, it is to be understood that weft knit fabric structures are contemplated within the scope of the invention. Because each of the yarns 12 is previously coated, the resulting textile structures 18, 20 provide highly superior conduction between the yarns 12 and throughout the entire fabric structure 18, 20. The individual yarns 12 are much less susceptible to surface wear, and the conduction grid of the fabric is not subject to breaks when the fabric is bent or stitched into a particular configuration. The individual conductivity of the yarns 12 is maintained at all times to provide the highest level of shielding possible in such a structure. Based upon preliminary testing of the fabric, it is believed that the fabric 10 has a capability of shielding an electromagnetic field with a power density of up to 10 $mw/cm^2$.

Figure 3:
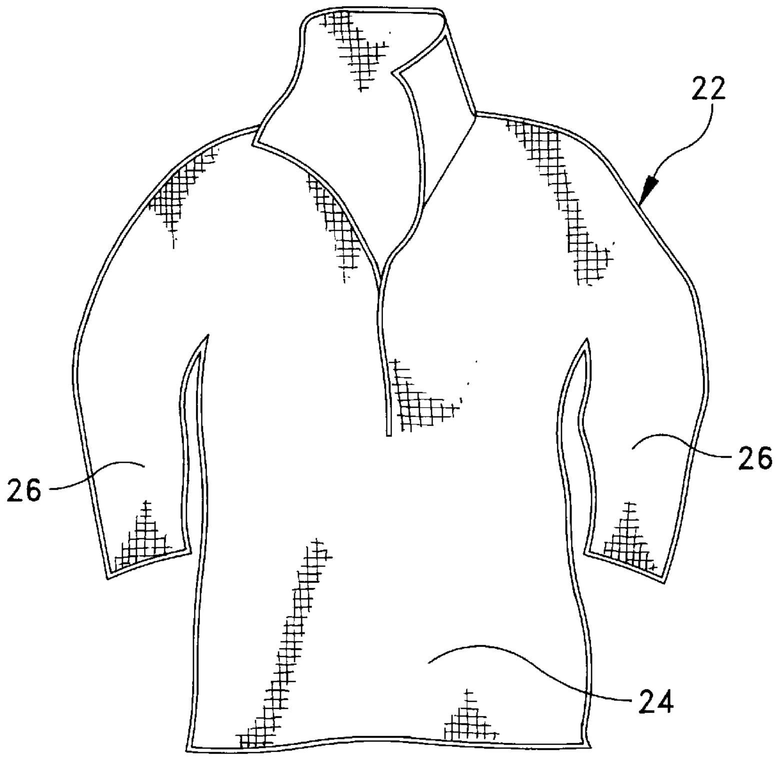
FIG. 3 is a perspective view of a shirt garment fashioned from the EMI shielding fabric.
Figure 4:
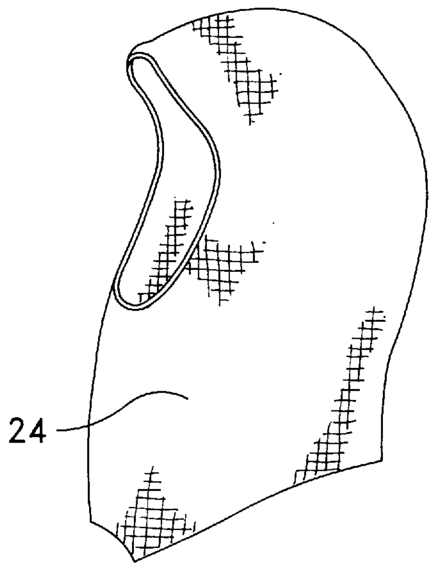
FIG. 4 is a perspective view of a hood fashioned from the EMI shielding fabric.
Figure 5:
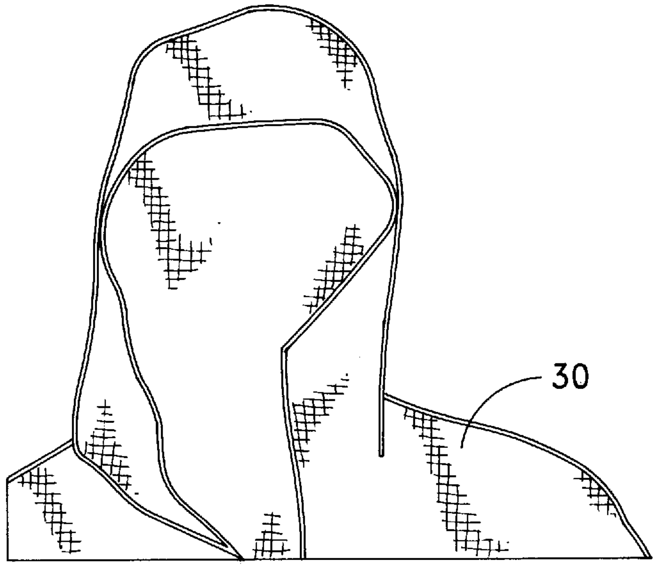
FIG. 5 is a perspective view of a hooded shirt fashioned from the EMI shielding fabric.
Figure 6:
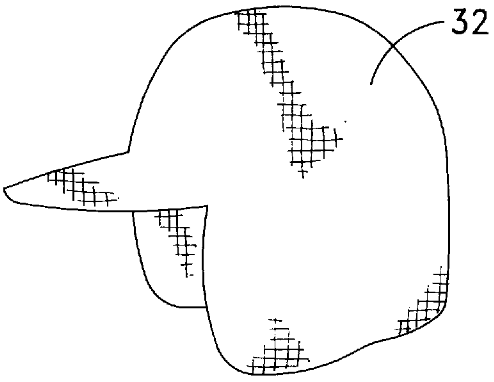
FIG. 6 is a perspective view of a cap fashioned from the EMI shielding fabric.
Figure 7:
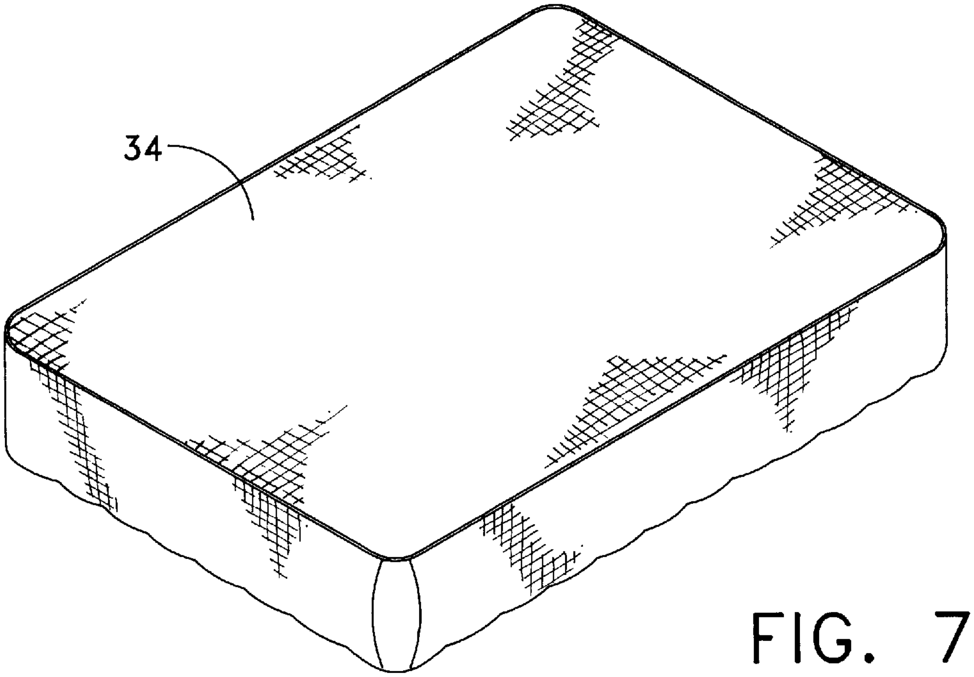
FIG. 7 is a perspective view of a bed sheet fashioned from the EMI shielding fabric.

Turning now to FIGS. 3–7, a variety of different three-dimensional shielding articles, constructed from the present shielding fabrics 10 are illustrated. In FIG. 3, a shirt-like garment 22 is illustrated for an intended use as a torso shield for a cardiac patient with a pacemaker. The garment 22 incudes a body portion 24 which covers the entire torso portion of the wearer, and further includes sleeves 26 for covering the arms of the wearer. All of the portions of the garment 22 are formed from the shielding fabric 10, and each of the individual garment panels are stitched together using metal coated yarns (not shown) to maintain conductivity between the respective garment portions. FIGS. 4, 5, 6, respectively illustrate a hood structure 28, a hooded jacket 30, and a cap 32, all for intended use as a head shield for a person that makes heavy use of cellular phones. Referring now to FIG. 7, a bed sheet structure 34 formed entirely from fabric 10 is illustrated. The bed sheet 34 is intended for use in a hospital, or other setting, wherein some type of EMI shielding is required or desired. For example, a cardiac patient in the hospital may benefit from the shielding capabilities of the bed sheet structure 34 while not wearing a shielding shirt, or alternatively, may benefit from such a product in the home wherein the bed sheet 34 could be used by a pacemaker patient for some level of protection while sleeping. Blankets and curtains could also be formed from the shielding fabric 10.

The key aspect of the present invention is that the fabric 10 is formed entirely from previously metal coated yarns 12, and that the shielding garments or articles made therefrom, are exclusively formed from the shielding fabric 10. As stated in the background, the biggest drawback to coating an entire piece of fabric after knitting is that the fabric structure tends to be susceptible to surface wear and abrasion, and is further subject to breaks in electrical connection between the yarns when the fabric is bent. By knitting a fabric 10 from previously metal coated yarns 12, a much higher level of conductivity and shielding is initially achieved than with articles that are coated after being formed into a garment of the like, and furtermore, the previously coated yarns do not tend to deteriorate as quickly as the after coated fabrics, and accordingly, the wear life of such garments and articles is increased.

It can therefore be seen that the present shielding fabric 10 provides superior shielding characteristics, while also being easy to manufacture according to a variety of different methods. The use of silver to coat the synthetic yarns 14 provides a highly reliable and highly conductive yarn structure 12 for use in forming the fabric 10. The fabric 10 can then easily be fashioned into a variety of garments or other desired fabric articles. The resulting garments provide three-dimensional protection which can be worn on a daily basis to provide necessary shielding where needed. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A flexible electromagnetic shielding fabric comprising a plurality of synthetic yarns which have been previously coated with a continuous exterior silver coating wherein the silver content of the silver-coated synthetic yarn is not less than 20% by weight, and the conductivity of the silver-coated yarn is not less than 1.2 ohms/cm, said plurality of silver-coated synthetic yarns being formed into said fabric by means of a textile fabrication method such that the fabric is comprised substantially entirely of said silver coated synthetic yarns, said silver-coated synthetic yarns of said fabric being individually freely slidably movable relative to adjacent yarns within the fabric to provide flexibility, said exterior silver coating of each of said silver-coated synthetic yarns being in sliding electrical contact with the exterior coating of adjacent silver-coated synthetic yarns to provide continuous, omni-directional conductivity from yarn to yarn throughout the entire fabric.

2. The electromagnetic shielding fabric of claim 1 wherein said silver-coated synthetic yarns comprise silver-coated nylon yarns.

3. The electromagnetic shielding fabric of claim 1 wherein said fabric comprises a warp-knit fabric.

4. The electromagnetic shielding fabric of claim 2 wherein said fabric comprises a warp-knit fabric.

5. The electromagnetic shielding fabric of claim 1 wherein said fabric comprises a woven fabric.

6. The electromagnetic shielding fabric of claim 2 wherein said fabric comprises a woven fabric.

7. The electromagnetic shielding fabric of claim 1 wherein said electromagnetic shielding fabric is fashioned into a three-dimensional garment structure which is capable of surrounding at least a portion of a predetermined body part.

8. The electromagnetic shielding fabric of claim 2 wherein said electromagnetic shielding fabric is fashioned into a three-dimensional garment structure which is capable of surrounding at least a portion of a predetermined body part.

9. The electromagnetic shielding fabric of claim 3 wherein said electromagnetic shielding fabric is fashioned into a three-dimensional garment structure which is capable of surrounding at least a portion of a predetermined body part.

10. The electromagnetic shielding fabric of claim 4 wherein said electromagnetic shielding fabric is fashioned into a three-dimensional garment structure which is capable of surrounding at least a portion of a predetermined body part.

11. The electromagnetic shielding fabric of claim 5 wherein said electromagnetic shielding fabric is fashioned into a three-dimensional garment structure which is capable of surrounding at least a portion of a predetermined body part.

12. The electromagnetic shielding fabric of claim 6 wherein said electromagnetic shielding fabric is fashioned into a three-dimensional garment structure which is capable of surrounding at least a portion of a predetermined body part.

13. The electromagnetic shielding fabric of claim 1 wherein said electromagnetic shielding fabric is fashioned into a three-dimensional bed covering structure which is capable of surrounding at least a portion of a bedding material.

14. The electromagnetic shielding fabric of claim 2 wherein said electromagnetic shielding fabric is fashioned into a three-dimensional bed covering structure which is capable of surrounding at least a portion of a bedding material.

15. The electromagnetic shielding fabric of claim 3 wherein said electromagnetic shielding fabric is fashioned into a three-dimensional bed covering structure which is capable of surrounding at least a portion of a bedding material.

16. The electromagnetic shielding fabric of claim 4 wherein said electromagnetic shielding fabric is fashioned into a three-dimensional bed covering structure which is capable of surrounding at least a portion of a bedding material.

17. The electromagnetic shielding fabric of claim 5 wherein said electromagnetic shielding fabric is fashioned into a three-dimensional bed covering structure which is capable of surrounding at least a portion of a bedding material.

18. The electromagnetic shielding fabric of claim 6 wherein said electromagnetic shielding fabric is fashioned into a three-dimensional bed covering structure which is capable of surrounding at least a portion of a bedding material.

* * * * *